(No Model.)

N. BASSET.
ACCUMULATING BATTERY.

No. 306,051. Patented Oct. 7, 1884.

Witnesses:

Inventor:
Nicolas Basset
Briesen & Steele
attorneys.

UNITED STATES PATENT OFFICE.

NICOLAS BASSET, OF PARIS, FRANCE.

ACCUMULATING-BATTERY.

SPECIFICATION forming part of Letters Patent No. 306,051, dated October 7, 1884.

Application filed January 5, 1884. (No model.) Patented in France November 30, 1883, No. 158,883.

*To all whom it may concern:*

Be it known that I, NICOLAS BASSET, a citizen of France, residing in Paris, in the Republic of France, have invented new and useful Improvements in Accumulating-Batteries, of which the following is a specification.

With reference to the technical details of a former application filed by me January 5, 1884, and known as Serial No. 116,567, and allowed August 19, 1884, for the formation of voltaic batteries, it should be remarked that the oxidized, chlorureted, and sulphureted compounds there described as susceptible of passing from an inferior to a superior state of oxidation, chloridation, or sulphuration by the passage of the primary current can serve as elements in secondary batteries, the discharge-current producing inverse effects of equal importance to those of the primary current.

The invention relates to the new formation of a secondary battery.

I give the preference in an economical point of view to an element composed as follows: two plates of retort-charcoal or agglomerated carbon, covered with natural peroxide of iron or granulated colcothar, wrapped in blotting-paper and held together by one or more strings. These plates form the electrodes, which are placed without a diaphragm in a more or less concentrated solution of protochloride of iron, and the whole forms an element of an accumulator or secondary battery.

For quantity or tension, I couple a number of similar elements, sufficient for the object desired, and the secondary battery is at once formed and prepared for charging. The jar is lined with a peculiar mastic.

Figure 1:
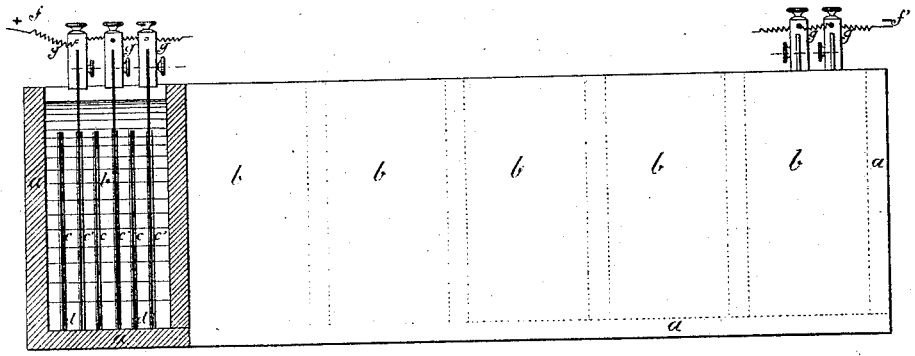
Figure 2:
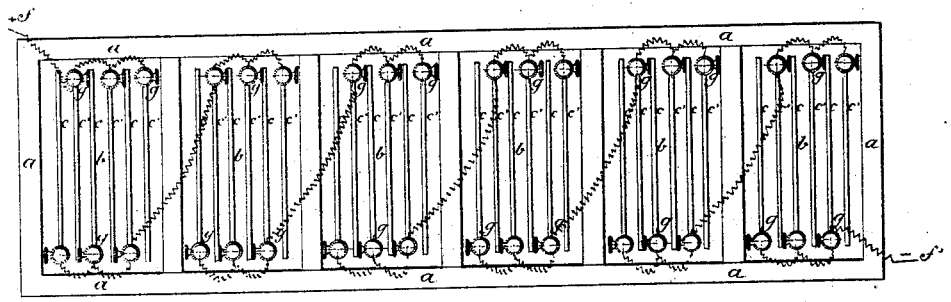
Figure 3:
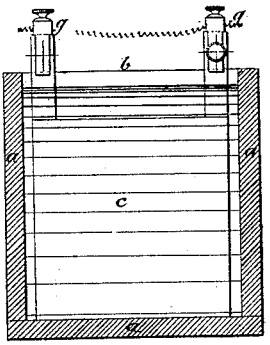

The drawings accompanying this description accurately show by Figures 1, 2, and 3 a battery of elements formed as above described. Fig. 1 is an elevation, partly in section. Fig. 2 is a plan of the complete battery, and Fig. 3 a transverse section of one of the chambers of the battery.

The box *a* is divided into a certain number of compartments or chambers, *b*, which are separated by partitions, so that they cannot communicate, each chamber *b* receiving a number of carbon plates, *c c'*, forming exactly similar elements. These plates, if desired, are covered with natural peroxide of iron or granulated colcothar, and then wrapped all over in blotting-paper *d*, kept in position by strings.

Figure 4:
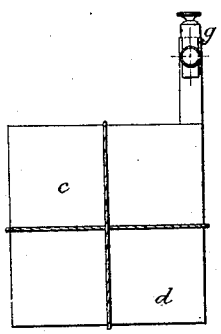

Fig. 4 accurately shows one of these carbon plates, each of which is supplied with a binding-screw for establishing the communications. These compartments or chambers contain similar elements composed, for example, of six carbons *c c'*, plunged into the solution of protochloride of iron, and united two and two, as shown. The elements are connected one with the other to form an accumulating-battery in tension, as shown by Fig. 2, or for quantity.

*f f'* are the wires of the poles of the battery.

It is perfectly clear that a battery can be formed on the same principle by using oxide of tin, binoxide, or deutoxide of manganese, minium, binoxide, or deutoxide of copper, (CuO,) &c., with some appropriate conducting-liquid in conformity with the rules herein established. I can also employ inert electrodes, not covered with oxide, acting simply as conductors, and placed in an active liquid susceptible of dialysis, such as the protochlorides, the protosulphates, and the protomanganates, or a mixture of these salts in variable proportions submitted to the action of the current, as already described, without excluding any of the bodies previously mentioned as fulfilling the requisite conditions for effecting my object, while expressly reserving to myself the right to employ them as occasion or circumstances may require.

I give no distinct preference either to the use of specular or oligist iron, the protochloride of iron in the shape of mixed elements, or the simple protochloride of iron, except on account of the low cost of these products.

The choice of the external jars employed rests merely on a point of economy, convenience, and lightness, porcelain, glass, or some inexpensive metal—such as white pig-iron, or, better still, wood, compressed paper, or cardboard—taking care, when required, to coat the internal surfaces with a layer of special mastic. This mastic is formed of thirty parts of yellow wax, thirty parts of resin, forty parts of paraffine, fifteen parts of pulverized colcothar, and it has the property of being an insulator of the first order.

Applications: My improved storage, secondary, or accumulating battery thus comprised is therefore formed of two electrodes coated with oxides and plunged either into the conducting-liquid, which is a saline solution of the same base or a simple saline-solution conductor. It can be charged by an electrical generator of some sort, by battery, or by machine. It has no necessity to be formed, and can be charged immediately it is constructed. The time of charging or of the passage of the primary current is limited by the reduction of the oxide of one of the electrodes and the re-oxidation of the other by the reduction of an equivalent of the salt dissolved in the conducting-liquid and the transformation of another equivalent super-salt or acid salt, or by this latter action alone when the electrodes are not coated with oxide. The result is that the length of the secondary reaction—that is to say, of the reflex current—is in proportion to the time required for the chemical reconstitution of the elements disassociated by the primary current. The intensity is proportionate to the chemical quantity of the oxide and salt dissolved, or in proportion of this latter only to the molecular surfaces resulting from dialysis and to the surfaces of the conducting-electrodes. The electro-motive force is at the mean one volt.

I apply this battery for all the purposes and usages of primary batteries, in the production of light by incandescence or by arc, for supplying the current for ringing bells or alarms, in galvanoplastics, the telegraph, the telephone, for deflagrating apparatus, the production of motive power, for driving machines, locomotives, for traction and propulsion. I also use the conducting-liquid which has been submitted to the dialytical action of the primary current as a veritable stock-current, in the sense that this liquid transported from a certain distance, occupying some time, has only to be emptied into a jar containing an inert electrode and plate of metal of the salt of solution to immediately supply a re-established current with all the effects of a true primary battery. This property consequently admits of and facilitates the transport of a current-generator at a trifling cost.

I claim—

1. A secondary battery containing in the vessel $a$ electrodes $c$ $c'$, each electrode being constructed of carbon covered with peroxide of iron and wrapped in blotting-paper, said electrodes being placed in a solution of protochloride of iron, substantially as specified.

2. In an electric battery, a jar or vessel lined with a mastic composed of paraffine, wax, resin, and pulverized colcothar in about the proportions specified.

NICOLAS BASSET.

Witnesses:
A. BLÉTRY,
C. BLÉTRY.